United States Patent
Ganapathiappan et al.

(10) Patent No.: US 10,280,299 B2
(45) Date of Patent: May 7, 2019

(54) COMPOSITIONS FOR THREE-DIMENSIONAL (3D) PRINTING

(71) Applicant: HEWLETT-PACKARD DEVELOPMENT COMPANY, L.P., Houston, TX (US)

(72) Inventors: Sivapackia Ganapathiappan, Los Altos, CA (US); Krzysztof Nauka, Palo Alto, CA (US); Hou T. Ng, Campbell, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 511 days.

(21) Appl. No.: 14/442,621

(22) PCT Filed: Nov. 19, 2012

(86) PCT No.: PCT/US2012/065827
§ 371 (c)(1),
(2) Date: May 13, 2015

(87) PCT Pub. No.: WO2014/077848
PCT Pub. Date: May 22, 2014

(65) Prior Publication Data
US 2015/0344682 A1    Dec. 3, 2015

(51) Int. Cl.
| | | |
|---|---|---|
| C08L 35/02 | (2006.01) | |
| C08F 212/10 | (2006.01) | |
| C08J 3/12 | (2006.01) | |
| C08L 33/00 | (2006.01) | |
| C09D 11/101 | (2014.01) | |
| C09D 11/38 | (2014.01) | |
| C09D 11/10 | (2014.01) | |
| B29C 64/124 | (2017.01) | |
| B33Y 70/00 | (2015.01) | |
| B33Y 10/00 | (2015.01) | |

(52) U.S. Cl.
CPC ............ *C08L 35/02* (2013.01); *B29C 64/124* (2017.08); *C08F 212/10* (2013.01); *C08J 3/12* (2013.01); *C08L 33/00* (2013.01); *C09D 11/10* (2013.01); *C09D 11/101* (2013.01); *C09D 11/38* (2013.01); *B33Y 10/00* (2014.12); *B33Y 70/00* (2014.12); *C08J 2309/02* (2013.01); *C08J 2309/06* (2013.01); *C08J 2369/00* (2013.01)

(58) Field of Classification Search
CPC ........ C08L 35/02; C08L 33/00; B29C 64/124; C08J 33/00; C08J 3/12; C08J 2309/06; C08J 2369/00; C08J 2309/02; C08F 212/10; C09D 11/10; C09D 11/38; C09D 11/101; B33Y 10/00; B33Y 70/00
See application file for complete search history.

(56) References Cited

U.S. PATENT DOCUMENTS

| | | | |
|---|---|---|---|
| 4,726,877 A * | 2/1988 | Fryd | ...................... G03F 7/027 216/43 |
| 5,622,813 A | 4/1997 | Kanda et al. | |
| 6,727,035 B2 | 4/2004 | Yamamura et al. | |
| 6,966,960 B2 | 11/2005 | Boyd et al. | |
| 7,550,518 B2 | 6/2009 | Bredt et al. | |
| 7,569,273 B2 | 8/2009 | Bredt et al. | |
| 8,106,107 B2 | 1/2012 | Napadensky | |
| 8,182,882 B2 | 5/2012 | Johnson et al. | |
| 2005/0175925 A1 | 8/2005 | Johnson et al. | |
| 2009/0105363 A1 | 4/2009 | Napadensky | |
| 2010/0015408 A1 | 1/2010 | Fong et al. | |
| 2010/0104832 A1 | 4/2010 | Messe et al. | |
| 2010/0272966 A1 | 10/2010 | Gould | |
| 2011/0262711 A1 | 10/2011 | Chopra et al. | |

FOREIGN PATENT DOCUMENTS

| | | |
|---|---|---|
| CN | 1555316 | 12/2004 |
| CN | 1812878 | 8/2006 |
| CN | 101631817 | 1/2010 |
| CN | 102093646 | 6/2011 |
| DE | 102007026006 | 4/2008 |
| EP | 0048841 | 4/1982 |
| EP | 0106628 | 4/1984 |
| EP | 0499072 | 8/1992 |
| EP | 2388146 | 11/2011 |
| GB | 1019660 | 2/1966 |
| GB | 2051090 | 1/1981 |
| JP | 2008045145 | 2/2008 |
| JP | 2008163302 | 7/2008 |
| JP | 2010006878 | 1/2010 |
| JP | 2010132780 | 6/2010 |
| WO | WO 03/010214 | 2/2003 |
| WO | WO 2008/004002 | 1/2008 |
| WO | WO 2008/110564 | 9/2008 |

OTHER PUBLICATIONS

The extended European search report for International Application No. PCT/US2012/065827 dated Jun. 21, 2016 17 pages.
The Supplementary Partial European Search Report for International Application No. PCT/US2012/065827 dated May 19, 2016, 8 pages.

* cited by examiner

*Primary Examiner* — Sanza L. McClendon
(74) *Attorney, Agent, or Firm* — Dierker & Kavanaugh PC

(57) ABSTRACT

A composition for three-dimensional printing includes a liquid, curable, cross-linkable monomer, solid thermoplastic particles mixed with the liquid, curable, cross-linkable monomer, and a light sensitive initiator mixed with the liquid, curable, cross-linkable monomer. The solid thermoplastic particles have a size ranging from about 200 nm to about 50 μm.

16 Claims, No Drawings

COMPOSITIONS FOR THREE-DIMENSIONAL (3D) PRINTING

BACKGROUND

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using digital light projection technology.

DETAILED DESCRIPTION

The present disclosure relates generally to compositions for three-dimensional (3D) printing.

Examples of the compositions disclosed herein generate 3D objects that exhibit both desirable mechanical properties (e.g., tensile strength, elongation performance, heat deflection, and/or impact strength) and a desirable surface finish (i.e., a surface RMS roughness less than 5 μm). This is advantageous over traditional thermoset materials, which often have a desirable surface finish, but exhibit poor elongation, impact strength, and/or dimensional accuracy. This is also advantageous over traditional thermoplastic materials (such as acrylonitrile butadiene styrene (ABS) resins), which often exhibit reasonable mechanical properties, but have a poor surface finish due to heat-assisted extrusion or sintering processes that are used for curing/fusing. It is believed that the ability to achieve the desired mechanical and surface finish properties in the examples disclosed herein is due, at least in part, to the type and amount of building blocks that are included in the compositions disclosed herein. In particular, the building blocks, when included in suitable proportions and exposed to light, are able to form an intertwined polymeric network that possesses the surface finish properties of 3D objects formed with traditional thermoset materials and the mechanical properties of 3D objects formed with traditional thermoplastic materials (e.g., polycarbonate).

Examples of the compositions disclosed herein include three building blocks, namely a rigid building block, an elastic building block, and a light sensitive building block. The rigid building block is a liquid, curable, cross-linkable monomer, the elastic building block is a solid thermoplastic particle, and the light sensitive building block is a light sensitive additive. In some instances, the composition includes these three building blocks alone (i.e., no other components added), and in other instances, the composition includes the three building blocks and a catalyst for polymerization (which will be discussed hereinbelow).

The liquid, curable, cross-linkable monomer is in liquid form in the composition, and generates a solidified polymer network after exposure to light. Examples of the liquid, curable, cross-linkable monomer include acrylate monomers, urethane monomers, epoxy monomers, siloxane monomers, and combinations thereof. Examples of the acrylate monomer include triethylene glycol dimethacrylate (TEG DMA), triethylene glycol diacrylate, di(ethylene glycol) dimethacrylate, tetraethylene glycol diacrylate, ethylene glycol dimethacrylate, and di(ethylene glycol) divinyl ether. Examples of the urethane monomer include aliphatic urethane acrylates of the CN9000 series from Sartomer, Exton, Pa. An example of the epoxy monomer is bisphenol A glycerate dimethacrylate, and an example of the siloxane monomer is vinyl terminated polydimethylsiloxane. In an example, PATTERN RESIN™ (an acrylic resin from GC America Inc., Alsip, Ill.) may also be used as the liquid, curable, cross-linkable monomer.

The amount of the liquid, curable, cross-linkable monomer used ranges from about 10 wt. % to about 70 wt. % of the total wt. % of the composition. In some instances, the amount of liquid, curable, cross-linkable monomer used depends upon the amount of solid micronized thermoplastic particles that are used. It is desirable that the liquid, curable, cross-linkable monomer be present in an amount that wets the amount of solid thermoplastic particle(s) used so that a uniform coating of the composition can be achieved when the composition is applied.

The solid thermoplastic particle(s) present in the composition disclosed herein are in solid form. The solid thermoplastic particles have a particle size ranging from about 200 nm to about 50 μm. In some examples, the particle size ranges from about 2 μm to about 35 μm, and in other examples, the particle size ranges from about 2 μm to about 10 μm or to about 20 μm. It has been found that when the particle size is too large, the composition is non-homogenous, and when the particle size is too small, the viscosity of the composition is too high (i.e., above 200,000 cps). A homogeneous mixture (as observed by the human eye) having a suitable viscosity is desirable so that the composition can be readily applied as a thin coating. When the viscosity is too high, it may be difficult to apply a relatively thin layer.

The material used for the solid thermoplastic particle(s) may be any thermoplastic material that has a melting point at or above 80° C. In some examples, the solid thermoplastic particle(s) include ethylene resins, propylene resins, acrylic resins, polyamide resins, polyurethane resins, milled acrylonitrile butadiene styrene, milled polycarbonate, or combinations thereof. Examples of suitable commercially available polyethylene resins include Honeywell A-C® 395A or Honeywell A-CO 316 (high-density oxidized polyethylene homopolymers available from Honeywell, Morristown, N.J.), Honeywell A-CO 9F (a polyethylene homopolymer available from Honeywell), ACumist® C-5 or ACumist® D-6 (micronized polyethylene homopolymers available from Honeywell), ACumist® A-5 (a micronized oxidized polyethylene homopolymer available from Honeywell), or combinations thereof. An example of a suitable propylene resin is Honeywell A-C® 1089 (a polypropylene homopolymer available from Honeywell). An example of a suitable acrylic resin is poly(methyl methacrylate). Powder polyurethane resins may be obtained by removing the water (e.g., by freeze-drying) from polyurethane latex polymers available from Sartomer.

When milled acrylonitrile butadiene styrene particles or milled polycarbonate particles are selected as the solid thermoplastic particles, the particles may be formed by an example of the method disclosed herein. The method generally includes exposing a solid thermoplastic particle precursor to a mixing process, and exposing the solid thermoplastic particle precursor to a predetermined temperature. The precursor in this example of the method is either a mixture of a carrier and acrylonitrile butadiene styrene (ABS) solids or a mixture of a carrier and polycarbonate solids. The acrylonitrile butadiene styrene solids or the polycarbonate solids may be in the form of powder, filaments, or sheets.

The carrier may be a polar carrier (e.g., water) or a non-polar carrier (e.g., ISOPAR™ isoparaffinic fluids from ExxonMobil Chemical Co., Houston, Tex., soy oils, and silicon oils). Organic solvents may also be used as the carrier. Examples of suitable organic solvents include isopropyl alcohol and hexane.

In this example of the method, the mixture of the carrier and ABS solids or polycarbonate solids is introduced into a grinding container. Grinding beads are also added to the grinding container. In an example, the grinding beads are stainless steel grinding beads having a size ranging from about 2 mm to about 5 mm. The mixture is ground at a rotation frequency ranging from about 100 rpm to about 10,000 rpm for a time ranging from about 30 minutes to about 90 minutes. During grinding, the temperature of the grinding environment (i.e., the previously mentioned predetermined temperature) is maintained to less than 50° C. This temperature ensures that the ABS solids or the polycarbonate solids do not melt.

In this example of the method, the carrier is removed after grinding is complete. The carrier may be removed under ambient conditions (e.g., from about 18° C. to about 30° C.) and via any method suitable for the particular carrier. Examples of suitable carrier removal techniques include filtration, evaporation, or freeze-drying. It is to be understood that the grinding beads are also removed upon the completion of the grinding process.

After carrier and grinding bead removal, aggregates of acrylonitrile butadiene styrene or aggregates of polycarbonate remain. The aggregates are then exposed to a size reduction process to obtain discrete, micronized ABS or polycarbonate particles (non-aggregated, individual particles) having a size ranging from about 200 nm to about 50 μm. The size reduction process may be a mild shear grinding process (e.g., mortar and pestle grinding) or another mild shear process (e.g., milling with beads in a Fritsch mill).

This example of the method results in milled acrylonitrile butadiene styrene particles or milled polycarbonate particles that are suitable for use as the solid thermoplastic particles disclosed herein. The size of these milled particles renders the milled particles suitable for inclusion in the composition(s) disclosed herein and suitable for 3D printing techniques that utilize light curing/fusing rather than heat-assisted extrusion methods or sintering methods.

In other examples, the solid thermoplastic particles are ABS-like particles that include a heteropolymer of styrene, octadecyl acrylate, methacrylonitrile, and ethylene glycol dimethacrylate. The octadecyl acrylate (having a glass transition temperature ($T_g$) of about 100° C.) in this material set replaces the butadiene homopolymer (having a $T_g$ of about 102° C.) of traditional ABS. The resulting solid thermoplastic particles that are made of these heteropolymers have a glass transition temperature ($T_g$) ranging from about 80° C. to about 150° C. In an example, the heteropolymer has a $T_g$ of about 102° C., which is similar to the $T_g$ (~103° C.) of ABS.

When the ABS-like particles are selected as the solid thermoplastic particles, the particles may be formed by another example of the method disclosed herein. As mentioned above, the method generally includes exposing a solid thermoplastic particle precursor to a mixing process, and exposing the solid thermoplastic particle precursor to a predetermined temperature. The precursor in this example of the method is a monomer emulsion of styrene, octadecyl acrylate, methacrylonitrile, and ethylene glycol dimethacrylate in water. In an example, a surfactant is also added to the monomer emulsion. When a surfactant is used, the amount may range from about 0.05 wt. % to about 5.0 wt. % with respect to the wt. % of the monomers used. Examples of suitable surfactants include MAXEMUL® 6106 (i.e., an anionic surfactant available from Croda USA, New Castle, Del.) and sodium dodecylsulfate.

During the preparation of the ABS-like particles, an initiator solution is utilized in combination with the monomer emulsion. The initiator solution includes an initiator dissolved in water. The initiator may be a free-radical initiator, such as azo compounds and organic peroxides, or a reduction-oxidation (i.e., redox) initiator, such as a persulfate salt (e.g., potassium persulfate and ammonium persulfate). In an example, about 2.5 g of initiator is added for about every 130 ml of water. It is to be understood, however, that the amount of initiator may vary depending, at least in part, on the monomer composition in the emulsion. The amount of initiator may also be used to adjust the rate of polymerization. In an example, the amount of initiator in the initiator solution ranges from about 0.2 wt. % to about 2.5 wt. % with respect to the total amount of monomers in the emulsion.

The initiator solution and the monomer emulsion are added to water to form a reaction mixture. The water may be used alone or in combination with a small amount of the initiator used in the initiator solution. In an example, about 0.6 g of the initiator is added to about 1160 ml of water. The water that receives the initiator solution and the monomer emulsion may be at a temperature ranging from about 20° C. to about 95° C. In an example, the water is heated to about 90° C.

In an example, the reaction mixture is formed by simultaneously adding the initiator solution and the monomer emulsion to the water. The simultaneous addition may be accomplished over a period of time while mixing (at a constant or varying speed) occurs. This may contribute to obtaining a more homogeneous reaction mixture.

The reaction mixture is maintained at the predetermined temperature for a predetermined time in order to achieve polymerization and cross-linking of the monomer(s) in the emulsion. The predetermined temperature may be anywhere from ambient temperature (e.g., about 20° C.) to about 95° C., and will depend, at least in part, upon the monomer(s) utilized. The reaction mixture may also be continuously mixed while polymerization and cross-linking are allowed to occur. After polymerization and cross-linking are complete (which may occur, e.g., after about 2 hours from when the monomer emulsion is added to the water), the final reaction product is cooled, e.g., to ambient temperature. The final reaction product includes at least water and aggregates of ABS-like particles.

The pH of the final reaction product may be adjusted to a value ranging from about 5 to about 9 utilizing a suitable pH adjuster. In some examples, the pH is adjusted to a value ranging from 5 to 8.5. If, for instance, the final reaction product is acidic, then a 50% potassium hydroxide solution may be used to adjust the pH to about 7.

The final reaction product may be filtered using, e.g., a mesh filter to obtain the aggregates of ABS-like particles in water having about 20% solids content. Thereafter, the aggregates of ABS-like particles are separated from the water by forced air circulation, freeze-drying, or another like technique.

The aggregates of ABS-like particles are then exposed to a size reduction process to obtain discrete, micronized ABS-like particles (non-aggregated, individual particles) having a size ranging from about 200 nm to about 50 µm. The size reduction process may be a mild shear grinding process (e.g., mortar and pestle grinding) or another mild shear process (e.g., milling with beads in a Fritsch mill).

This example of the method results in ABS-like particles that are suitable for use as the solid thermoplastic particles disclosed herein. The monomer selection enables a solution-based process for 3D printing that utilizes light curing/fusing rather than heat-assisted extrusion methods or sintering methods. It is further believed that the ABS-like particles disclosed herein may be suitable for use in other applications, such as latex inkjet printing applications, in printing overcoats and/or undercoats, injection molding techniques, etc.

The amount of the solid thermoplastic particle(s) present in the composition is 80 wt. % or less of a total wt. % of the composition. The amount included may depend, at least in part, upon the material used for the particle(s). For example, when polyethylene resin particles or Honeywell A-C® 395A particles are selected for the solid thermoplastic particles, a suitable amount is, respectively, 50 wt. % or less or 55 wt. % or less. For another example, when polyamide resin particles are selected for the solid thermoplastic particles, a suitable amount is 40 wt. % or less. For still another example, when the ABS-like particles disclosed herein are selected for the solid micronized thermoplastic particles, a suitable amount is 45 wt. % or less. In any of the examples disclosed herein, too much of the solid thermoplastic particle(s) may result in a powdery composition that exhibits poor adhesion to an underlying substrate, mold, etc.

The 3D printing composition also includes the light sensitive building block, which is a light sensitive additive such as a light sensitive initiator. A "light sensitive" additive is a component that is activated upon exposure to light. As an example, a light sensitive initiator is a chemical compound that absorbs the light to which it is exposed. The absorbed energy is transferred from the chemical compound to monomer(s) present in the composition to generate radicals. The generated radicals react with other monomer(s) to induce polymerization and generate a polymer. If catalyst(s) are also present, the radical formation is readily activated. As mentioned, the light sensitive initiator is used to promote a polymerization reaction. The light sensitive additive used depends, at least in part, on the wavelength(s) suitable for curing/fusing the liquid, curable, cross-linkable monomer(s) that are used. In an example, the light sensitive additive may be sensitive to light having a wavelength ranging from about 400 nm to about 600 nm. In another example, the light sensitive additive is sensitive to light having a wavelength ranging from about 460 nm to about 480 nm:

Examples of suitable light sensitive initiators include GENOCURE® CQ (i.e., a camphor quinone available from Rahn USA Corp., Aurora, Ill.) and initiators available from Spectra Group Ltd., Inc., Millbury, Ohio, such as H-Nu 470 (i.e., 5,7-diiodo-3-butoxy-6-fluorone), H-Nu 470X (i.e., a powder blend), H-Nu 470IL (i.e., a liquid blend containing N,N-dimethylacrylamide), H-Nu 470LT (i.e., a liquid blend), H-Nu 535 (i.e., 2,4,5,7-Tetraiodo-3-hydroxy-6-fluorone), and H-Nu 635 (i.e., 2,4,5,7-Tetraiodo-3-hydroxy-9-cyano-6-fluorone). Combinations of various initiators may also be used.

The total amount of each light sensitive additive that is added depends, at least in part, on the amount of liquid, curable, cross-linkable monomer that is used. In an example, any of the light sensitive initiators are respectively included in an amount ranging from about 0.1 wt. % to about 5 wt. % of the wt. % of the liquid, curable, cross-linkable monomer. In another example, any of the light sensitive initiators are respectively included in an amount ranging from about 0.5 wt. % to about 2 wt. % of the wt. % of the liquid, curable, cross-linkable monomer.

Some examples of the composition also include a catalyst that speeds up the rate of polymerization. Examples of suitable catalysts include alkyl amines or diphenyliodonium salts, which increase the cure rate of the composition. Other examples of suitable catalysts include GENOMER® 5161 (i.e., an acrylated amine synergist available from Rahn USA Corp.) or GENOCURE® EHA (i.e., an aminobenzoate synergist available from Rahn USA Corp.). The total amount of each catalyst that is added depends, at least in part, on the amount of liquid, curable, cross-linkable monomer that is used. In an example, the catalyst may be present in an amount ranging from about 0.1 wt. % to about 5 wt. % of the wt. % of the liquid, curable, cross-linkable monomer.

The composition may be made by mixing the solid thermoplastic particle(s) with the liquid, curable, cross-linkable monomer having the light sensitive additive incorporated therein. Mixing may be accomplished with standard mixing or milling equipment. In an example, mixing is accomplished for a predetermined number of cycles, with a predetermined time for cooling between cycles.

The resulting composition has a viscosity up to 200,000 cps. As examples, the viscosity of the composition may range from about 50 cps to about 10,000 cps, or from about 100 cps to about 5,000 cps. The viscosity may be changed by altering the solids content (i.e., the amount of solid micronized thermoplastic particles included) and/or by adding a solvent to the composition. The consistency of the resulting composition may range anywhere from a liquid to a paste.

When used in a 3D printing process, the composition may be applied as a thin film on a surface (i.e., a substrate, a mold, etc.) using a materials printer or a spreading mechanism (such as a doctor blade or a roller). The thin film may have a thickness ranging from about 20 µm to about 500 µm.

Once the desired thin film is applied, all or portion(s) of the thin film is/are exposed to light of a suitable wavelength for a fixed duration. The light exposure causes the composition to cure, polymerize, cross-link, etc. The wavelength(s) of the light used will depend upon the liquid, curable, cross-linkable monomer(s) that are used. In an example, the light has a wavelength ranging from about 400 nm to about 600 nm. The timing for light exposure may range anywhere from 1 µs to 5 min, depending upon the thickness of the thin film and/or the illumination intensity. As an example, a 100 µm thick film may be exposed to light for about 1 µs when a light source having a high illumination intensity is used. Any illumination intensity above 50 mW/cm$^2$ may be considered high illumination intensity. The time may be expanded as desired in order to ensure complete curing. Exposing the thin film to light forms a solidified layer of a 3D product that has a desirable shape.

A second thin film of the composition may be applied to all or portion(s) of the solidified layer, and the light exposure process may be repeated to form a second solidified layer of the 3D product. The process may be repeated until the desired 3D product is formed. It is to be understood that additional thin film application and polymerization results in an increase in the thickness of all or portion(s) of the original solidified layer.

The compositions disclosed herein enable the 3D products to be formed relatively quickly due, at least in part, to the rapid reaction kinetics of the compositions. For example, a 10"×10"×10" part may be fabricated in less than 4 hours. This is a significant improvement over 8 hours to 10 hours that may be needed for product fabrication using traditional thermoplastic or thermoset materials and/or heat assisted curing.

After the 3D product is formed, any uncured composition may be removed by wiping or washing with water and a surfactant or soap, or a suitable organic liquid (e.g., isopropanol) that will not deleteriously affect the surface of the 3D product.

After washing, the 3D product may be exposed to a heating process. This heating process may assist in settling the solid thermoplastic particles within the solidified layer(s) to form more compact layer(s). Performing an additional heating process after any uncured composition is removed may also cause additional cross-linking to occur in the layer(s) that remain. Heating may be accomplished for a predetermined time (e.g., ranging from about 15 minutes to about 120 minutes) at a predetermined temperature (e.g., ranging from about 70° C. to about 100° C.). As an example, heating may be performed at about 90° C. for up to about 30 minutes.

It is believed that the 3D product formed from the composition disclosed herein may exhibit about 65% of the mechanical properties of traditional ABS resins. For example, the 3D final product made via the compositions disclosed herein may exhibit a tensile modulus greater than 2 GPa, a tensile strength of up to 45 MPa, elongation at break of up to 14% and an impact strength of about 50 J/m.

To further illustrate the present disclosure, an example is given herein. It is to be understood that this example is provided for illustrative purposes and is not to be construed as limiting the scope of the present disclosure.

Example

Seven different examples of the composition disclosed herein were prepared and used to form dog bone shaped 3D objects. The dog bone shaped 3D objects were exposed to tests for tensile modulus, tensile strength at break, and elongation at break.

Solid Thermoplastic Particles

ABS-Like Particles

A monomer emulsion was prepared by emulsifying styrene (296 g), octadecyl acrylate (20 g), methacrylonitrile (80 g) and ethylene glycol dimethacrylate (4 g) in water (136 ml) containing MAXEMUL® 6106 (3.2 g) surfactant. An initiator solution was prepared by dissolving potassium persulfate (2.56 g) in water (128 ml).

Water (1160 ml) was heated to a temperature of 90° C. Solid KPS (0.6 g) was added to the hot water. The emulsion and the initiator solution were added to the hot water over 43 minutes and 45 minutes, respectively. The reaction mixture was maintained at a temperature of about 90° C. for a period of 2 hours and then was cooled to ambient temperature. The pH of final solution was then adjusted to 7.0 with 50% potassium hydroxide solution.

The product was filtered with 200 mesh filter to obtain ABS-like particles in water with about 20% solid content. The water was removed at ambient temperature. The ABS-like particles were ground with a mortar and pestle to obtain discrete ABS-like particles having an average size of 250 nm and occasional aggregates.

Polyethylene or Polyamide Particles

The polyethylene particles that were used were polyethylene resin particles and Honeywell A-C® 395A particles. Polyamide resin particles were also used.

Compositions

Compositions With ABS-Like Particles

The ABS-like particles described above were mixed with triethylene glycol dimethacrylate (TEG DMA) or PATTERN RESIN™, which had 1.5 wt. % of GENOCURE® CQ and GENOCURE® EHA mixed therein. Various samples were made so that the final compositions had 25 wt. % of the ABS-like particles (Sample 1), 15 wt. % of the ABS-like particles (Samples 2 and 2A), or 35 wt. % of the ABS-like particles (Samples 3, 3A and 4). The respective mixtures were mixed thoroughly in a SpeedMixer (model DAC 150 FVZ) for five cycles, each of which included 1 minute of mixing and 1 minute of cooling.

The respective mixtures were maintained at ambient temperature for at least a day to form clear viscous mixtures. At this stage, the ABS-like particles appeared to swell so that the various compositions were pastes. These pastes were respectively applied on a dog bone shaped type V mold to have a thickness of about 0.7 mm. The applied pastes were exposed to 470 nm blue light (using a Qubit system, model Z760) for 2 minutes (with curing readily taking place within about 30 seconds). The application and curing process was repeated three additional times to achieve sample of 2.8 mm thickness.

Some of the compositions, namely Samples 3A and 4A, were exposed to an additional heating process at about 90° C. for up to 30 minutes.

Compositions With Polyethylene or Polyamide Particles

The composition for Samples 5 and 5A was made by mixing Honeywell A-C® 395A particles with triethylene glycol dimethacrylate, which had 1.5 wt. % of GENOCURE® CQ and GENOCURE® EHA mixed therein. The wt. % of the Honeywell A-C® 395A particles was 55 wt. %. The mixture was mixed thoroughly in a SpeedMixer (model DAC 150 FVZ) for five cycles, each of which included 1 minute of mixing and 1 minute of cooling. The composition was applied on a dog bone shaped V mold to have a thickness of about 0.7 mm. The applied composition was exposed to 470 nm blue light (using a Qubit system, model Z760) for 2 minutes (with curing readily taking place within about 30 seconds). The application and curing process was repeated three additional times to achieve sample of 2.8 mm thickness. Sample 5A was exposed to an additional heating process at about 90° C. for up to 30 minutes.

The composition for Samples 6 and 6A was made by mixing polyethylene resin particles with triethylene glycol dimethacrylate, which had 1.5 wt. % of GENOCURE® CQ and GENOCURE® EHA mixed therein. The wt. % of the polyethylene resin particles was 50 wt. %. The mixture was mixed thoroughly in a SpeedMixer (model DAC 150 FVZ) for five cycles, each of which included 1 minute of mixing and 1 minute of cooling. The composition was applied on a dog bone shaped V mold to have a thickness of about 0.7 mm. The applied composition was exposed to 470 nm blue light (using a Qubit system, model Z760) for 2 minutes (with curing readily taking place within about 30 seconds). The application and curing process was repeated three additional times to achieve sample of 2.8 mm thickness. Sample 6A was exposed to an additional heating process at about 90° C. for up to 30 minutes.

The composition for Samples 7 and 7A was made by mixing polyamide particles with triethylene glycol dimethacrylate, which had 1.5 wt. % of GENOCURE® CQ and GENOCURE® EHA mixed therein. The wt. % of the polyamide particles was 42 wt. %. The mixture was mixed thoroughly in a SpeedMixer (model DAC 150 FVZ) for five cycles, each of which included 1 minute of mixing and 1 minute of cooling. The composition was applied on a dog bone shaped V mold to have a thickness of about 0.7 mm. The applied composition was exposed to 470 nm blue light (using a Qubit system, model Z760) for 2 minutes (with curing readily taking place within about 30 seconds). The application and curing process was repeated three additional times to achieve sample of 2.8 mm thickness. Sample 7A was exposed to an additional heating process at about 90° C. for up to 30 minutes.

Results

For tensile modulus tests, the various Samples were sandwiched between two glass plates with a spacer to have a uniform thickness. Each sample layer was exposed to 470 nm blue light for 2 minutes. The glass plates were then removed and each sample was tested using a dedicated tensile tester or a TA DMA (Dynamic Mechanical Analysis) equipped with a tension clamp.

Table 1 shows exemplary correlation between the composition of the respective samples and the selected mechanical properties, such as tensile modulus, tensile strength at break, and elongation at break.

TABLE 1

| Sample | Solid TP Particles | Crosslinker | Amount of thermoplastics in the cross-linker (wt. %) | Tensile modulus (MPa) | Tensile strength at break (MPa) | Elongation at break (%) |
|---|---|---|---|---|---|---|
| 1 | ABS-like particles | TEG DMA | 25 | 1605 | N/A | N/A |
| 2 | ABS-like particles | TEG DMA | 15 | 1339 | 15.86 | 1.1 |
| 3 | ABS-like particles | Pattern resin | 35 | 82 | 2.41 | 6.9 |
| 3A | Composition of Sample 3 heated to 90° C. for 30 minutes | | | 67 | 1.72 | 6.1 |
| 4 | ABS-like particles | TEG DMA | 35 | 1362 | 9.85 | 1 |
| 4A | Composition of Sample 4 heated to 90° C. for 30 minutes | | | 1397 | 21.1 | 0.9 |
| 5 | Honeywell A-C 395 | TEG DMA | 55 | 1707 | N/A | N/A |
| 5A | Composition of Sample 5 heated to 90° C. for 30 minutes | | | 1428 | 6.34 | 3.3 |
| 6 | Polyethylene resin particles | TEG DMA | 50 | 796 | 15.86 | 1.1 |
| 6A | Composition of Sample 6 heated to 90° C. for 30 minutes | | | 1024 | 11.51 | 1.6 |
| 7 | Polyamide resin particles | TEG DMA | 42 | 1550 | 10.48 | 0.7 |
| 7A | Composition of Sample 7 heated to 90° C. for 30 minutes | | | 1763 | 11.76 | 0.9 |

As illustrated in Table 1, varying the sample composition changes the respective mechanical properties. Thus, depending on the application, the sample composition providing the highest elongation at break or the best elastic properties (high tensile modulus) may be selected.

It is to be understood that the ranges provided herein include the stated range and any value or sub-range within the stated range. For example, a range from about 200 nm to about 50 µm should be interpreted to include not only the explicitly recited limits of about 200 nm to about 50 µm, but also to include individual values, such as 500 nm, 5,000 nm (i.e., 5 µm), 30,000 nm (i.e., 30 µm), etc., and sub-ranges, such as from about 1 µm to about 20 µm, from about 250 nm to about 25 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A composition for three-dimensional printing, the composition comprising:
   a liquid, curable, cross-linkable monomer;
   solid thermoplastic particles mixed with the liquid, curable, cross-linkable monomer, the solid thermoplastic particles consisting of i) a homopolymer selected from the group consisting of polyethylene, oxidized polyethylene, and polypropylene, or of ii) milled polycarbonate, or of iii) milled acrylonitrile butadiene styrene, and having a size ranging from about 200 nm to about 50 µm; and
   a light sensitive initiator mixed with the liquid, curable, cross-linkable monomer.

2. The composition as defined in claim 1 wherein an amount of the solid thermoplastic particles present in the composition is 80 wt. % or less of a total wt. % of the composition.

3. A composition for three-dimensional printing, the composition comprising:
   a liquid, curable, cross-linkable monomer;
   solid thermoplastic particles mixed with the liquid, curable, cross-linkable monomer, the solid thermoplastic particles:
      having a size ranging from about 200 nm to about 50 µm;
      being formed of a heteropolymer of styrene, octadecyl acrylate, methacrylonitrile, and ethylene glycol dimethacrylate; and
      having a glass transition temperature ($T_g$) ranging from about 80° C. to about 150° C.; and a light sensitive initiator mixed with the liquid, curable, cross-linkable monomer.

4. The composition as defined in claim 1, further comprising a catalyst.

5. The composition as defined in claim 1 wherein:
the light sensitive initiator is sensitive to wavelengths ranging from 400 nm to 600 nm; and
the light sensitive initiator is present in an amount ranging from about 0.1 wt. % of a wt. % of the liquid, curable, cross-linkable monomer to about to about 5 wt. % of the wt. % of the liquid, curable, cross-linkable monomer.

6. A three-dimensional printing method, comprising:
applying the composition as defined in claim 1 as a film on a surface; and
exposing the film to light, thereby polymerizing the liquid, curable, cross-linkable monomer and forming a solidified layer of a three-dimensional product.

7. The three-dimensional printing method as defined in claim 6 wherein the composition is applied so that the film has a thickness ranging from about 20 µm to about 500 µm.

8. The three-dimensional printing method as defined in claim 6, further comprising heating the solidified layer to a predetermined temperature for a predetermined time.

9. A method for making the solid thermoplastic particles as defined in claim 3, the method comprising:
exposing a solid thermoplastic particle precursor to a mixing process, wherein the solid thermoplastic particle precursor is a monomer emulsion of the styrene, the octadecyl acrylate, the methacrylonitrile, and the ethylene glycol dimethacrylate in water; and
exposing the solid thermoplastic particle precursor to a predetermined temperature.

10. The method as defined in claim 9 wherein:
the mixing process includes mixing the monomer emulsion with an initiator solution to form a reaction mixture; and
the reaction mixture is exposed to the predetermined temperature for a predetermined time to form the solid thermoplastic particles.

11. The method as defined in claim 10 wherein the solid thermoplastic particles are formed in the water, and wherein the method further comprises:
removing the solid thermoplastic particles from the water; and
exposing the solid thermoplastic particles to a size reduction process to obtain particles having a size ranging from about 200 nm to about 50 µm.

12. A method for making the solid thermoplastic particles as defined in claim 1, the method comprising:
exposing a solid thermoplastic particle precursor to a mixing process, wherein the solid thermoplastic particle precursor is a mixture of i) a carrier and acrylonitrile butadiene styrene solids or ii) a carrier and polycarbonate solids, the acrylonitrile butadiene styrene solids or polycarbonate solids being in powder form, filament form, or sheet form; and
exposing the solid thermoplastic particle precursor to a predetermined temperature;
wherein the mixing process includes:
introducing the mixture into a grinding container;
introducing grinding beads into the grinding container with the mixture;
grinding the mixture at a rotation frequency ranging from about 100 rpm to about 10,000 rpm for a time ranging from about 30 minutes to about 90 minutes;
wherein the predetermined temperature is maintained to less than 50° C. during the grinding; and
wherein after the grinding, the method further comprises removing the carrier and the grinding beads to obtain aggregates of acrylonitrile butadiene styrene or aggregates of polycarbonate.

13. The method as defined in claim 12, further comprising exposing the aggregates of acrylonitrile butadiene styrene or the aggregates of polycarbonate to a size reduction process to obtain particles having a particle size within a range of from about 200 nm to about 50 µm.

14. The composition as defined in claim 1 wherein the liquid, curable, cross-linkable monomer is selected from the group consisting of triethylene glycol dimethacrylate, triethylene glycol diacrylate, di(ethylene glycol) dimethacrylate, tetraethylene glycol diacrylate, ethylene glycol dimethacrylate, di(ethylene glycol) divinyl ether, bisphenol A glycerate dimethacrylate, and vinyl terminated polydimethlsiloxane.

15. A composition for three-dimensional printing, the composition consisting of:
a liquid, curable, cross-linkable monomer;
solid thermoplastic particles mixed with the liquid, curable, cross-linkable monomer, the solid thermoplastic particles formed of a single homopolymer or a single heteropolymer and having a size ranging from about 200 nm to about 50 µm;
a light sensitive initiator mixed with the liquid, curable, cross-linkable monomer; and
optionally a catalyst.

16. The composition as defined in claim 15 wherein:
the solid thermoplastic particles are selected from the group consisting of ethylene resins, propylene resins, acrylic resins, polyamide resins, polyurethane resins, milled acrylonitrile butadiene styrene, milled polycarbonate, and combinations thereof; and
the liquid, curable, cross-linkable monomer is selected from the group consisting of acrylate monomers, urethane monomers, epoxy monomers, siloxane monomers, and combinations thereof.

* * * * *

UNITED STATES PATENT AND TRADEMARK OFFICE
CERTIFICATE OF CORRECTION

PATENT NO. : 10,280,299 B2
APPLICATION NO. : 14/442621
DATED : May 7, 2019
INVENTOR(S) : Sivapackia Ganapathiappan et al.

It is certified that error appears in the above-identified patent and that said Letters Patent is hereby corrected as shown below:

In the Claims

In Column 11, Line 10, Claim 5, delete "to about to about" and insert -- to about --, therefor.

Signed and Sealed this
Thirtieth Day of July, 2019

Andrei Iancu
*Director of the United States Patent and Trademark Office*